United States Patent
Pronto et al.

(10) Patent No.: US 10,127,175 B2
(45) Date of Patent: Nov. 13, 2018

(54) AVIONICS SYSTEM OF AN AIRCRAFT COMPRISING LINE REPLACEABLE UNITS THAT CAN EXCHANGE MESSAGES BETWEEN THEM AND DEVICE FOR MONITORING SUCH AN AVIONICS SYSTEM

(71) Applicant: Airbus Operations (SAS), Troulouse (FR)

(72) Inventors: Dominique Pronto, Colomiers (FR); Lionel Deramond, Montastruc la Conserillere (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 326 days.

(21) Appl. No.: 15/186,652

(22) Filed: Jun. 20, 2016

(65) Prior Publication Data
US 2017/0097915 A1 Apr. 6, 2017

(30) Foreign Application Priority Data
Oct. 5, 2015 (FR) .................................. 15 59422

(51) Int. Cl.
*G06F 13/00* (2006.01)
*G06F 19/00* (2018.01)
(Continued)

(52) U.S. Cl.
CPC ...... *G06F 13/4068* (2013.01); *G06F 11/3027* (2013.01); *G06F 13/4004* (2013.01)

(58) Field of Classification Search
None
See application file for complete search history.

(56) References Cited

U.S. PATENT DOCUMENTS

| | | | |
|---|---|---|---|
| 5,103,450 A | | 4/1992 | Whetsel |
| 5,325,359 A | * | 6/1994 | Jordan ................ G06F 13/4027 370/463 |

(Continued)

FOREIGN PATENT DOCUMENTS

EP 0578386 1/1994

OTHER PUBLICATIONS

French Search Report, dated Mar. 1, 2016, priority document.

*Primary Examiner* — Cheng-Yuan Tseng
(74) *Attorney, Agent, or Firm* — Greer, Burns & Crain, Ltd.

(57) ABSTRACT

An aircraft avionics system comprising rack mounted line replaceable units that exchange messages between them via a bus. The avionics system comprises a monitoring device arranged in the rack comprising a connector electrically linked to the bus and into which a rack mounted line replaceable unit is plugged, to be electrically linked to the bus. The monitoring device also monitors the messages exchanged, via the bus, between the line replaceable unit plugged into its connector and other units of the avionics system. The monitoring device comprises an acquisition unit to acquire signals transmitted or received by the line replaceable unit plugged into the connector during the exchange of messages with at least one other unit of the avionics system, for converting the signals into storable digital data and for assigning clock data to the data, and a storage unit for storing the storable digital data and the clock data.

15 Claims, 3 Drawing Sheets

(51) Int. Cl.
*G06F 13/40* (2006.01)
*G06F 11/30* (2006.01)

(56) References Cited

U.S. PATENT DOCUMENTS

| | | | |
|---|---|---|---|
| 8,963,741 B1* | 2/2015 | Righi | G05B 23/0216 |
| | | | 340/945 |
| 9,692,828 B2* | 6/2017 | Claudel | H04L 67/12 |
| 2008/0309349 A1 | 12/2008 | Sutono | |
| 2010/0281199 A1 | 11/2010 | Fu et al. | |

* cited by examiner

AVIONICS SYSTEM OF AN AIRCRAFT COMPRISING LINE REPLACEABLE UNITS THAT CAN EXCHANGE MESSAGES BETWEEN THEM AND DEVICE FOR MONITORING SUCH AN AVIONICS SYSTEM

CROSS-REFERENCES TO RELATED APPLICATIONS

This application claims the benefit of the French patent application No. 1559422 filed on Oct. 5, 2015, the entire disclosures of which are incorporated herein by way of reference.

BACKGROUND OF THE INVENTION

The present invention relates to an avionics system of an aircraft comprising line replaceable units that can exchange messages between them via one or more communication buses and a monitoring device for monitoring the messages exchanged between a line replaceable unit of the avionics system and at least one other unit of the avionics system.

The various apparatuses of an avionics system take the form of units which can be plugged into a rack so as to be able to be replaced, for example in case of failure, easily and very rapidly, even if the aircraft concerned is in flight. Such units are commonly referred to in the aircraft field by their acronym LRU, standing for Line Replaceable Unit. In the present description, the LRU units are called line replaceable units.

For example, an avionics system dealing with all the communication functions between the ground and the aircraft comprises a unit called ATSU, the acronym for Air Traffic Services Unit and a radio unit called VDR, the acronym for Very High Frequency Data Radio (VHF data radio). Each of these units is housed in an LRU unit. The first incorporates an air/ground communication router making it possible to switch applications of AOC (Airline Operational Control) type and of ATC (Air Traffic Control) type, exchanging between the crew of the airplane and the airline for the AOC applications, on the one hand, and the air control entities for the ATC applications, on the other hand Moreover, another function of this ATSU unit is to encode the applications exchanged. As for the second LRU unit (of VDR type), it is linked, among others, to the ATSU unit, and serves as physical medium for the exchange of communications between the airplane concerned and the ground in a frequency band corresponding to the VHF band. This VDR radio unit thus makes it possible to exchange voice signals between the airplane and the ground, and digital data via a "datalink" stream.

It is necessary to record the data which are exchanged between the LRU units of an avionics system, for various reasons, if only to check whether each of these LRU units is operating correctly, notably in the case of dense air traffic where messages may not be transmitted because of very high data traffic and to thus be able to resend the messages, and if such is not the case, either to remedy the situation which has provoked the observed malfunction, or, if necessary, to replace the failing unit with another of the same type.

Today, such recordings are made by means of large recorders placed in the cabin of the aircraft and which are linked by specific cables to the different LRU units. This recording process happens to be complex, introduces relatively significant delays and creates interferences between the recorded signals and the operational signals due primarily to the fact that the cables linking the LRU units and the recorder radiate in the manner of an antenna. It is also known practice to use specific recorders placed in the avionics rack. However, here also, this process happens to introduce relatively significant delays and also creates interferences between the recorded signals and the operational signals, as previously due to the length of the cables.

There is therefore a benefit to be gained in having available means for monitoring the messages exchanged between a line replaceable unit (units called LRUs) of an avionics system and at least one other unit of the avionics system which do not present the drawbacks described above and, notably, which do not disturb, through the recording, the operational signals.

SUMMARY OF THE INVENTION

The present invention therefore proposes an avionics system of an aircraft comprising line replaceable units that can exchange messages between them via one or more communication buses, the replaceable units being mounted in a rack. To simplify the description of the invention, a communication bus assembly will be considered as a single bus (a global interface) throughout the present application and will be called "the communication bus."

According to the present invention, the avionics system comprises a monitoring device mounted in the rack comprising a connector which, on the one hand, is electrically linked to the bus and into which, on the other hand, a line replaceable unit mounted in the rack is plugged to be electrically linked to the bus, the monitoring device comprising:

an acquisition unit for acquiring the signals transmitted or received by the line replaceable unit plugged into the connector during the exchange of messages with at least one other unit of the avionics system, for converting the signals into storable digital data and for assigning clock data to the data, and a storage unit for storing the storable digital data and the corresponding clock data.

The present invention relates also to a device for monitoring an avionics system as has just been described and which is distinguished in that it comprises:

a connector intended to be plugged into a connector housed in the rack and electrically linked to the bus, a connector which is linked to the connector and into which a line replaceable unit mounted in the rack can be plugged to be electrically linked to the bus via the connector, the monitoring device comprising:

an acquisition unit for acquiring the signals transmitted or received by the line replaceable unit plugged into the connector during the exchange of messages with at least one other unit of the avionics system, for converting the signals into storable digital data and for assigning clock data to the data, and a storage unit for storing the storable digital data and the corresponding clock data.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

The invention therefore relates to an avionics system of an aircraft comprising line replaceable units (also called LRU units) that can exchange messages between them via a bus, the replaceable units LRU being mounted in a rack. An avionics system according to the invention comprises a monitoring device for monitoring the messages exchanged between units of the avionics system via this bus.

Figure 1A:
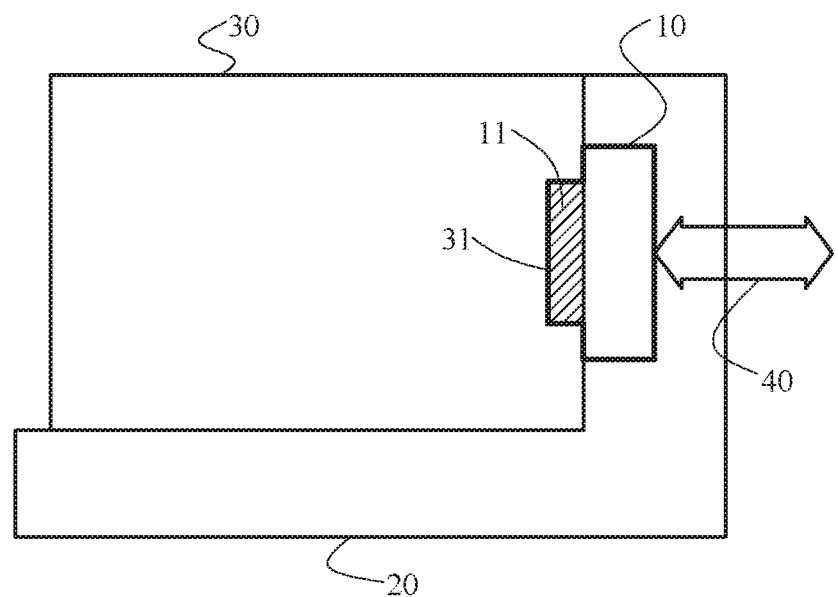
FIG. 1a shows an installation of a device for monitoring an avionics system according to the invention and in a first embodiment.
Figure 1B:
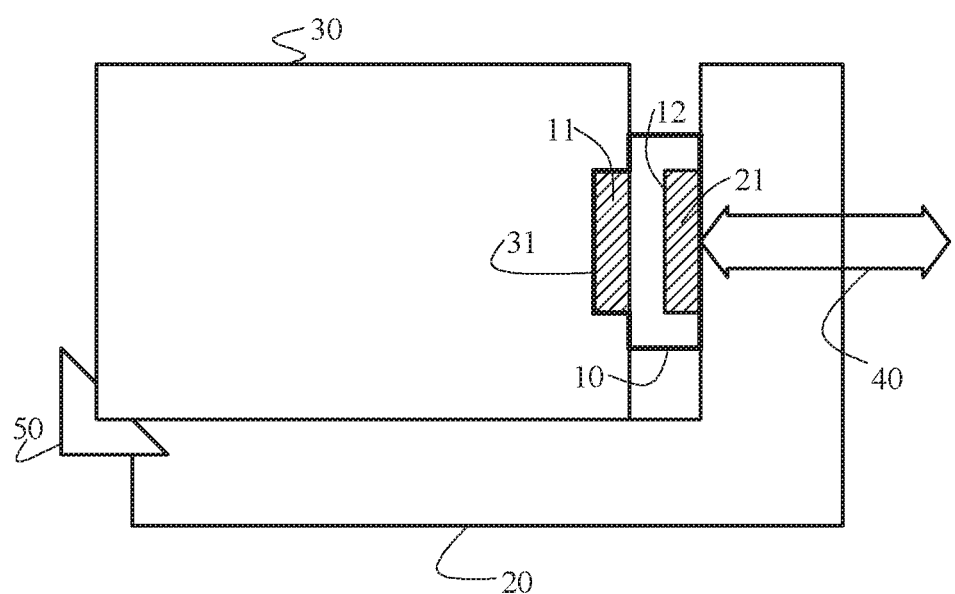
FIG. 1b shows an installation of a device for monitoring an avionics system according to the invention and in a second embodiment.
Figure 2A:
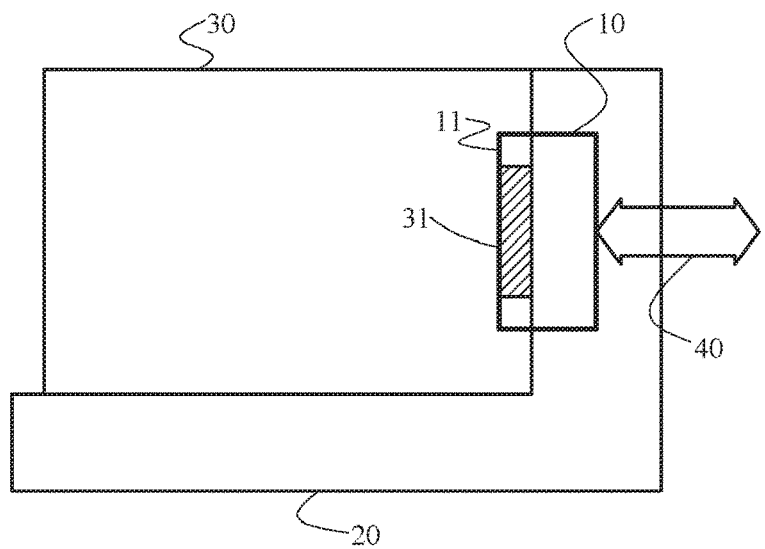
FIG. 2a shows an installation of a device for monitoring and avionics system according to the invention and in a third embodiment, a variant of the first embodiment.
Figure 2B:
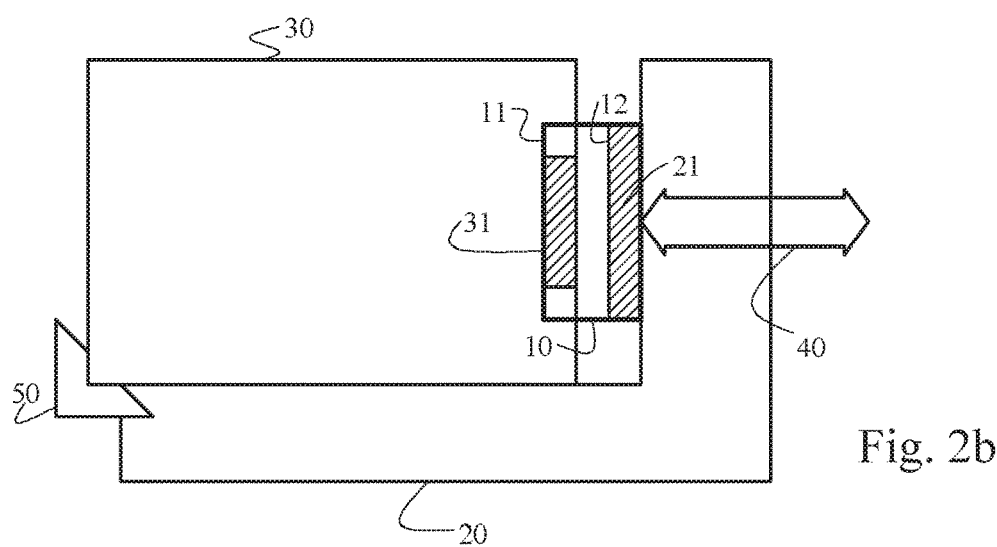
FIG. 2b shows an installation of a device for monitoring an avionics system according to the invention and in a fourth embodiment, a variant of the second embodiment.

Such a monitoring device 10, arranged between a rack and an LRU unit, as is represented in FIGS. 1a and 1b and in FIGS. 2a and 2b comprises a connector 11 which, on the one hand, is electrically linked to a bus 40 of an avionics system by which an LRU unit 30 exchanges messages with other units of the avionics system, and into which, on the other hand, the LRU unit 30 is plugged to be electrically linked to the bus 40. Furthermore, this monitoring device 10 is provided to be able to monitor the messages which travel via the bus 40 between the LRU unit 30 and at least one other unit of the avionics system.

More specifically, FIG. 1a shows a first embodiment of the present invention according to which a monitoring device 10 according to the invention is arranged at the back of a rack 20 and an LRU unit 30 is plugged into the connector 11 of the monitoring device 10. The connector 11 is provided to receive a complementary connector 31 of the LRU unit 30 in order to ensure the various necessary electrical connections. The monitoring device 10 is electrically linked to the bus 40 ensuring the interconnection of the LRU units of the avionics system concerned.

FIG. 2a shows another embodiment, a variant of this first embodiment, according to which the connector 11 is a generic connector and the connector 31 of the LRU unit 30 is a connector specific to the LRU unit 30 concerned (the connector 11 is thus represented as wider than the connector 31). The generic connector 11 makes it possible to connect any type of specific connector 31 and therefore accepts all types of LRU units which do not all have the same connection systems.

Generally, a connector is said to be of the generic type if a connector, itself called connector of the specific type, of an LRU unit of any type and this so-called generic connector have structures such that they can be connected to one another, both mechanically and electrically.

FIG. 1b shows a second embodiment of the present invention according to which a monitoring device 10 according to the invention is plugged by means of a connector 12 into a connector 21 mounted at the back of a rack 20 (the monitoring device 10 is consequently arranged in the rack 20) and an LRU unit 30 which is itself plugged into a connector 11 of the monitoring device 10 by means of a complementary connector 31. The connector 21 of the rack 20 is electrically linked to a bus 40 ensuring the interconnection of the LRU units of the avionics system concerned.

In this embodiment, because of the excess thickness created by the monitoring device 10, a wedge 50 is provided to ensure the mechanical mounting of the LRU unit 30.

FIG. 2b shows another embodiment, a variant of the second embodiment, according to which the connector 11 is a generic connector and the connector 31 of the LRU unit 30 is a connector specific to the LRU unit 30 concerned. According to this variant, the connectors 12 and 21 are generic connectors.

Figure 2C:
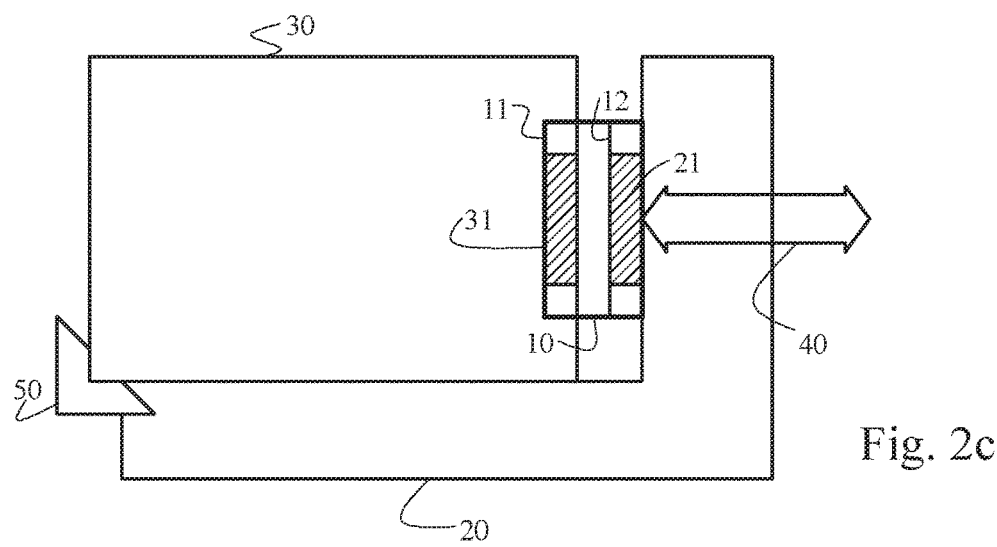
FIG. 2c shows an installation of a device for monitoring an avionics system according to the invention and in a fifth embodiment, a variant of the second embodiment.

FIG. 2c shows another embodiment, a variant of the second embodiment, according to which the connectors 11 and 12 are generic connectors and the connectors 31 of the LRU unit 30 and 21 of the rack are connectors specific to the LRU unit 30 concerned and to the rack concerned.

Figure 3:
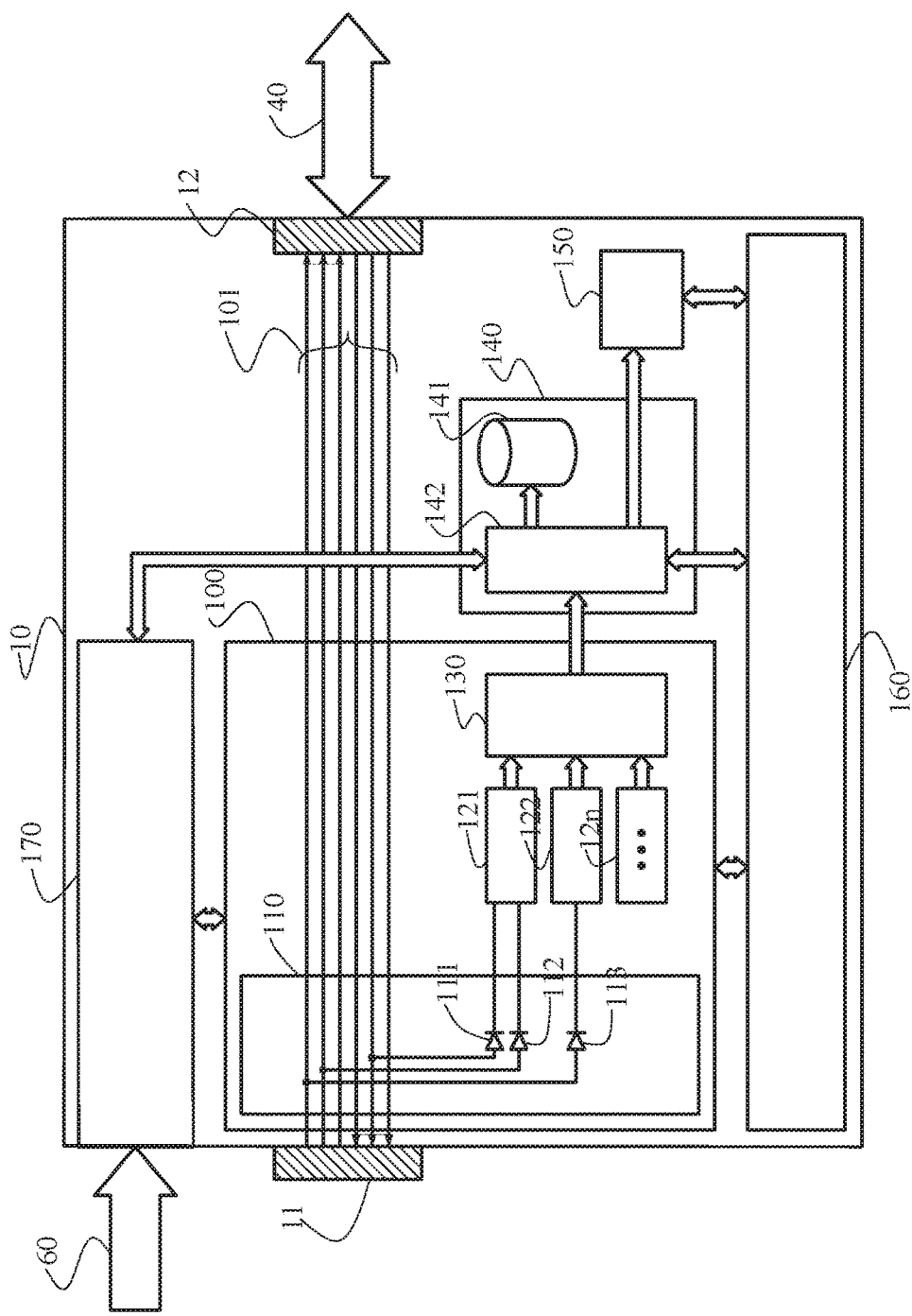
FIG. 3 is a block diagram showing the functional devices of a monitoring device according to the present invention.

FIG. 3 shows a monitoring device 10 and the various functional devices of which it is composed. Thus, this monitoring device 10 comprises an acquisition unit 100 of which the inputs receive the different signals present at the terminals of the connector 11 (into which an LRU unit can be plugged) of the monitoring device 10 and also present on the wires 101 which are linked to the bus 40 (either directly as in FIGS. 1a and 2a, or via a connector 12 as in FIGS. 1b, 2b and 2c). The acquisition unit 100 comprises a router 110 which routes the various signals transmitted and received by the LRU unit 30 and present on the wires 101 to convey them, via electronic electrical insulation devices 111 to 113 allowing the signals on the wires 101 not to be disturbed by the acquisition and not to create interferences between them, to the inputs of specialized acquisition boards 121 to 12n. In the case of ARINC429 signals, such electronic electrical insulation devices 111 to 113 are for example optocouplers. The acquisition boards 121 to 12n can be removable and be put in place according to the use of the monitoring device 10 envisaged. They are for example plugged into slots provided for this purpose.

For example, each of the specialized acquisition boards 121 to 12n makes it possible to acquire signals conforming to one of the following formats: analogue, binary (NRZ, NRZI, etc.), RS232, RS422, CAN, Ethernet, ARINC429, AFDX network, etc.

The acquisition unit 100 also comprises a convertor 130 for converting the digital signals at the output of the acquisition boards 121 to 12n into a format suitable for storage. Furthermore, the convertor 130 assigns each converted digital signal a clock datum which is stored at the same time as the converted digital signal.

The monitoring device 10 also comprises a storage unit 140 which essentially consists of a mass memory 141, advantageously a non-volatile memory, for example of FLASH type, and a unit 142 for managing the storage in the mass memory 141. The mass memory 141 may also consist of a removable memory card, for example of SD, MicroSD, MS, MMC, CompactFlash, etc. type, that can thus be read after storage, by a remote analysis apparatus (not represented) provided for this purpose. The management unit 142 is provided to manage not only the writing and the reading of the data in the mass memory 141, but also to manage the writing errors and the lost data, for example by inserting flags for the data concerned. The management unit 142 is also provided for the storage operations to be performed in real time, the data from the convertor 130 being written at the same time as the corresponding clock data.

The monitoring device 10 also comprises a communication unit 150 which is provided to transmit the data which are read by the storage unit 140 to a remote analysis apparatus 70. This communication unit 150 can use at least one of the following technologies: Wi-Fi, WIMAX, Bluetooth®, Ethernet, USB, μUSB, etc.

The management unit 142 is also provided to read the data which have been written in the mass memory 141 and transmit them to the communication unit 150 which then transmits them to a remote analysis apparatus 70. This operation can be performed at a later time, that is to say after the recording of the data.

In real time, the management unit 142, at the same time as it transmits the data from the convertor 130 to the mass memory 141, transmits these data to the communication unit 150 for transmission to a remote analysis apparatus. In this case, the communication unit 150 can receive synchronization data from the remote analysis apparatus 70. An SNMP protocol can also be implemented between the communication unit 150 and the remote apparatus.

The operation of the acquisition unit 100, of the storage unit 140 and of the communication unit 150 is supervised by a control unit 160 which ensures the synchronization between these units 100, 140 and 150, controls the starting or the stopping of the recordings in the storage unit 140 according, for example, to the requests received from a remote analysis apparatus by the communication unit 150, encrypts the data read in the storage unit 140 before the transmission thereof by the communication unit 150, detects the presence or not of an LRU unit plugged into the connector 11 (for example by using the RFID technology), etc.

The control unit 160 also manages the events which occur concerning the signals present on the wires 101, that is to say, the signals transmitted or received by the line replaceable unit 30 during the exchange of messages with at least one other unit of the avionics system. These events are, for example, the detection of these signals, the particular formatting thereof, the encryption thereof, the recording thereof in the storage unit 140, the transmission thereof by the communication unit 150, etc.

The monitoring device 10 also comprises a configuration unit 170 which makes it possible to configure the acquisition unit 100 and the storage unit 140, notably its management unit 142. For this, the monitoring device 10 enters into communication with a remote configuration system (not represented) to collect the values given to configuration parameters, either by means of a communication apparatus 60 using a USB, μUSB, Ethernet, Wi-Fi, etc. technology, or by means of a memory card (not represented) in which the configuration parameter values are stored. The values of these configuration parameters are for example entered manually by an operator or automatically according to the circumstances. They may be parameters which are defined in an ICD (Interface Control Document) document.

These configuration parameters can define the signals which are the object of the acquisition and therefore their type (analogue, binary (NRZ, NRZI, etc.), RS232, RS422, CAN, Ethernet, ARINC429, AFDX networks, etc.). The parameters of the signals relate, for example, to the pin of the connector 11 concerned, the wire concerned out of the wires 101, the impedance matchings affecting them (50 Ω, 75 Ω, infinite impedance, etc.), the desired recording time, a possible delay for the start of recording, the triggering criterion or criteria, the type of clock signals which is assigned to them (local clock, NTP (Network Time Protocol), GPS, etc.), etc.

The configuration can also relate to whether the data are recorded in the mass memory 141 and/or if they are transmitted by means of the communication unit 150. It can also relate to the power supply mode of the monitoring device 10: internal power supplies (cells, batteries, etc.) or external power supplies (12 V or 28 V originating from the power supply sources of the airplane, power supply originating from the USB interface or from the Ethernet interface [POE], etc.).

An example is given below of the use of a monitoring device according to the invention in the case where it is installed between the bus 40 of an avionics system of an aircraft, which comprises an LRU unit of ATSU type as mentioned in the foreword of this description, and an LRU unit of VDR type.

When the aircraft is on the ground, by means of a remote configuration system, such as a computer of PC type, provided with a Wi-Fi interface, the monitoring device is configured by using the communication apparatus 60. During this configuration, the pins of the connector 11 or the wires 101 to be monitored will be specified, as will the corresponding protocol types, here ARINC 429, at high speed, the recording time, the type of clock for the clock data, here synchronized with the GPS signals, the type of the specific connectors 11 and 21 (see FIG. 1b) for the LRU unit 30 of VDR type (defined both on the bus side 40 and on the LRU side), etc. The duly configured monitoring device is plugged into the connector 21 of the rack 20 (see FIG. 1b) then the LRU unit 30 is plugged into the connector 11 of the monitoring device.

In flight, when the ATSU unit transmits an applicative message to the LRU unit 30 of VDR type (this message is supported by a bus of ARINC 429 type according to the Williamsburg protocol) for it to be transferred to the ground, the acquisition unit 100 routes the signals corresponding to this message (present on the wire or wires 101 which have been configured for this) to the acquisition board 121 corresponding to the type of signals concerned (here ARINC 429). The acquired signals are converted by the unit 130 and clock data are added. All of these data are written into the mass memory 141.

In return, the LRU unit 30 of VDR type transmits to the ATSU unit a message indicating that the message has been sent correctly or not sent due to the density of traffic in the zone in which the aircraft is located, the message then being recorded in the mass memory 141 with the corresponding clock data.

The two messages (ATSU→VDR and VDR→ATSU) are therefore recorded in the mass memory 141 with the corresponding clock data. If access to the mass memory 141 fails, a flag indicating that the data present are not valid is recorded. If such a flag is recorded, the data are written again.

If a particular event occurs, it is recorded in the mass memory 141, for example, in a specific space of the mass memory 141.

The data which are written in the mass memory 141 are advantageously encrypted, for example, by the control unit 160.

When the aircraft returns to the ground, the content of the mass memory 141 is offloaded from the mass memory 141, by the management unit 142, and transmitted to the communication unit 150 which transmits it in turn to a remote analysis apparatus 70, for example, by Wi-Fi. In the remote analysis apparatus 70, the offloaded data can be analyzed.

A monitoring device according to the invention is easy to install and is installed rapidly. Because it takes up little space and it is thus housed in the rack which receives the line replaceable units, it has no impact on the number of spaces occupied in the airplane, which was not the case when using large recorders.

Moreover, because it does not require the use of cables to be connected to the bus 40, no parasitic interference is created on the signals of the bus 40 and the recorded signals. Similarly, these signals are not corrupted. Furthermore, no crosstalk is created between the analogue signals.

Finally, the electrical consumption is low. The same applies for the interferences on the power supply lines of the aircraft.

The cost of such a device is low. It is simple to configure so it can be easily adapted to new needs for monitoring signals between LRU units.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An avionics system of an aircraft comprising line replaceable units that can exchange messages via a bus, said replaceable units being mounted in a rack, said avionics system comprising:
    a monitoring device arranged in said rack comprising a connector electrically linked to said bus, wherein a line replaceable unit mounted in said rack is plugged into said monitoring device to be electrically linked to said bus via said monitoring device, said monitoring device being configured to monitor the messages exchanged, via said bus, between said line replaceable unit plugged into a connector of the monitoring device and other units of the avionics system,
    wherein said monitoring device comprises:
    an acquisition unit configured to acquire signals transmitted or received by said line replaceable unit plugged into said connector during the exchange of messages with at least one other unit of said avionics system, said acquisition unit being further configured to convert said signals into storable digital data and assign clock data corresponding to said storable digital data,
    a storage unit configured to store the storable digital data and the corresponding clock data, and
    a communication unit configured to transmit to a remote analysis apparatus said storable digital data and the corresponding clock data stored by said storage unit.

2. The avionics system as claimed in claim 1, wherein the connector of said monitoring device is a connector of generic type allowing any type of line replaceable unit to be plugged in and connected via a specific connector of said line replaceable unit.

3. The avionics system as claimed in claim 1, wherein said monitoring device comprises another connector electrically linked to the connector of the monitoring device and to said bus, said other connector being plugged into a connector at the back of said rack.

4. The avionics system as claimed in claim 3, wherein the connector of said monitoring device is a connector of generic type allowing it to be plugged in and connected to a connector at the back of said rack of a specific or generic type.

5. The avionics system as claimed in claim 1, wherein said monitoring device further comprises a configuration unit configuring said acquisition unit and said storage unit, said configuration unit comprising an interface to enter into communication with a configuration system and thus entering values of configuration parameters of said line replaceable units.

6. The avionics system as claimed in claim 1, wherein said monitoring device further comprises a control unit controlling said acquisition unit, said storage unit and said communication unit.

7. The avionics system as claimed in claim 6, wherein said control unit is provided to manage the various events concerning the signals transmitted or received by said line replaceable unit upon the exchange of messages with at least one other unit of said avionics system.

8. The avionics system as claimed in claim 1, wherein said acquisition unit comprises a router which routes various signals transmitted or received by said line replaceable unit to convey them to specialized acquisition boards according to a format of said signals acquired and routed.

9. The avionics system as claimed in claim 8, wherein said acquisition unit comprises a convertor converting the digital signals at the output of the specialized acquisition boards into storable digital data and assigning clock data corresponding to said storable digital data.

10. The avionics system as claimed in claim 8, wherein said acquisition unit comprises electrical insulation amplifiers allowing said signals transmitted or received by said line replaceable unit not to be disturbed by the acquisition and not to create interferences among said signals.

11. The avionics system as claimed in claim 1, wherein said storage unit comprises a mass memory and a management unit, said management unit being provided to manage the writing and the reading of data in said mass memory and the writing errors and the lost data by inserting, during storage, flags for the data affected by these errors or these losses.

12. The avionics system as claimed in claim 11, wherein said mass memory comprises a memory board that is removable and that can be read by a remote analysis apparatus.

13. The avionics system as claimed in claim 11, wherein said management unit is provided to read the data which have been written in the mass memory and to transmit said read data to the communication unit; wherein said data is transmission to a remote apparatus.

14. A monitoring device for monitoring an avionics system comprising line replaceable units mounted in a rack and that can exchange messages via a bus, said monitoring device being provided to monitor the messages exchanged between the line replaceable units and units of the avionics system via said bus, said monitoring device comprising:
    a first connector configured to be plugged into a connector that is housed in said rack and electrically linked to said bus,
    a second connector electrically linked to said first connector, wherein a line replaceable unit mounted in said rack is configured to be plugged into the second connector to be electrically linked to said bus via said first connector, wherein the line replaceable unit comprises:

an acquisition unit configured to acquire signals transmitted or received by said line replaceable unit plugged into said second connector during the exchange of messages with at least one other unit of said avionics system, said acquisition unit being further configured to convert said signals into storable digital data and assign clock data corresponding to said storable digital data, a storage unit configured to store the storable digital data and the corresponding clock data, and a communication unit configured to transmit to a remote analysis apparatus said storable digital data and the corresponding clock data stored by said storage unit.

15. A device for monitoring an avionics system comprising line replaceable units mounted in a rack and that can exchange messages between the line replaceable unit and the rack via a bus, said monitoring device being provided to monitor the messages exchanged between the line replaceable units and units of the avionics system via said bus, said monitoring device comprising:

a first connector configured to be plugged into a connector that is housed in said rack and electrically linked to said bus, a second connector electrically linked to said first connector, wherein a line replaceable unit mounted in said rack is configured to be plugged into the second connector to be electrically linked to said bus via said first connector, wherein the line replaceable unit comprises:

an acquisition unit configured to acquire signals transmitted or received by said line replaceable unit plugged into said second connector during the exchange of messages with at least one other unit of said avionics system, said acquisition unit being further configured to convert said signals into storable digital data and assign clock data corresponding to said storable digital data, a storage unit configured to store the storable digital data and the corresponding clock data, a communication unit configured to transmit to a remote analysis apparatus said storable digital data and the corresponding clock data stored by said storage unit; and a control unit configured to control said acquisition unit, said storage unit and said communication unit;

wherein the acquisition unit comprises:

a router configured to route the various signals transmitted or received by said line replaceable unit; and electrical insulation devices coupled to said router allowing said signals transmitted or received by said line replaceable unit not to be disturbed by the acquisition by said acquisition unit and not to create interferences between said signals.

\* \* \* \* \*